Dec. 7, 1971   A. WORTMAN   3,625,056
ENTHALPY AND PRESSURE SENSOR
Filed Jul. 7, 1969   3 Sheets-Sheet 1

INVENTOR.
ANDREW WORTMAN

BY

SOKOLSKI & WOHLGEMUTH
ATTORNEYS

Dec. 7, 1971  A. WORTMAN  3,625,056

ENTHALPY AND PRESSURE SENSOR

Filed July 7, 1969  3 Sheets-Sheet 2

INVENTOR.
ANDREW WORTMAN

BY

SOKOLSKI & WOHLGEMUTH
ATTORNEYS

United States Patent Office 3,625,056
Patented Dec. 7, 1971

3,625,056
ENTHALPY AND PRESSURE SENSOR
Andrew Wortman, Santa Monica, Calif., assignor to Northrop Corporation, Beverly Hills, Calif.
Filed July 7, 1969, Ser. No. 839,330
Int. Cl. G01k 17/00
U.S. Cl. 73—190 R          10 Claims

ABSTRACT OF THE DISCLOSURE

A sensor for measuring the recovery pressure and enthalpy of very high energy flows, which comprises a temperature sensor disposed in the nose of the device with means for additionally determining the pressure in the temperature sensing region. Further, means is provided for transpiration cooling the temperature sensing element together with secondary means for transpiration cooling the entire skin of the sensing device.

---

Atmospheric reentry flight requires extensive experimentation in ground facilities which simulate actual flight conditions. Though several steady state and transient flow facilities are in operation, the instrumentation needed has not been developed to the point where it is satisfactory. In steady state flow facilities definition of local flow conditions generally involve separate stagnation pressure and heat transfer measurements. Total enthalpy of the flow is derived from a semi-empirical heat transfer relation. The frequently employed slug-type transient calorimeters can only make one measurement at a time so that test flow surveys, and even simple monitoring of flow conditions are both unwieldy and time consuming.

Internally cooled steady state calorimeters suffer from the fundamental problem of matching a high enthalpy potential heat flux with a very low enthalpy potential internal convective heat transfer. The only way of accomplishing this is to circulate coolant at a very high rate. Since the energy increase is determined by external flow, high coolant flow rates result in relatively small rise in the coolant temperature and internal losses and corrections become large. Direct measurements of the stream enthalpy by means of calorimeters which capture samples of the test flow present non-trivial design and fabrication problems and are inherently subject to errors. Fundamental objections may be raised against such an approach on the ground that the captured sample must be diluted by an order of magnitude greater mass of coolant before any temperature measurements can be made. Mixing of flows in such proportions means that the test flow sample is only a small fraction of the thermodynamic system and a minor error in the measurements of the system results in a major error in the definition of the thermodynamic state of the test flow. Thus, it is readily apparent that there are serious problems of measuring enthalpies of high-energy steady state flows.

Thus, an object of this invention is to provide a device and method for measuring enthalpy of high-energy quasi steady state flows.

Still another object of this invention is to provide a device of simple construction which can sustain high reentry heating while providing accurate data for enthalpy and thus the vehicle velocity calculations.

The above and other objects of the invention are provided by a device which in its simplest embodiment comprises a housing terminating in a flat nose portion. Disposed in the nose of the device is a thin disc to which is connected temperature sensing thermocouples to determine the temperature in this location. Means is provided for transpiration cooling the temperature sensing disc. Further, a pressure transducer is disposed so as to determine the stagnation pressure at the temperature sensing disc area of the probe. Secondary cooling means is additionally provided to cool the outer skin of the probe, where a device can be used at high temperature or high energy environment. The primary coolant flow rate to the temperature sensing element is regulated by a valve which is controlled by the temperature signal from the thermocouples. The coolant flow rate is additionally metered, with the information of this flow rate together with the temperature measurements and stagnation pressure determination, fed to a computer which will calculate the total enthalpy of the system as well as providing velocity data in accord with mathematical determinations which will hereinafter be explained. In additional embodiments of the invention, the nose of the sensing probe is hemispherical and has located therein at least four additional pressure transducers equidistantly disposed, which serve to give information concerning the angular displacements which can be displayed in terms of the measured angles of yaw and attack of the probe. In a further embodiment the input from the additional pressure transducers is utilized to rotate the principal temperature sensor axis into the free stream velocity. It is believed that the invention will be better understood from the following detailed description and drawings, of which:

Figures 1, 2:
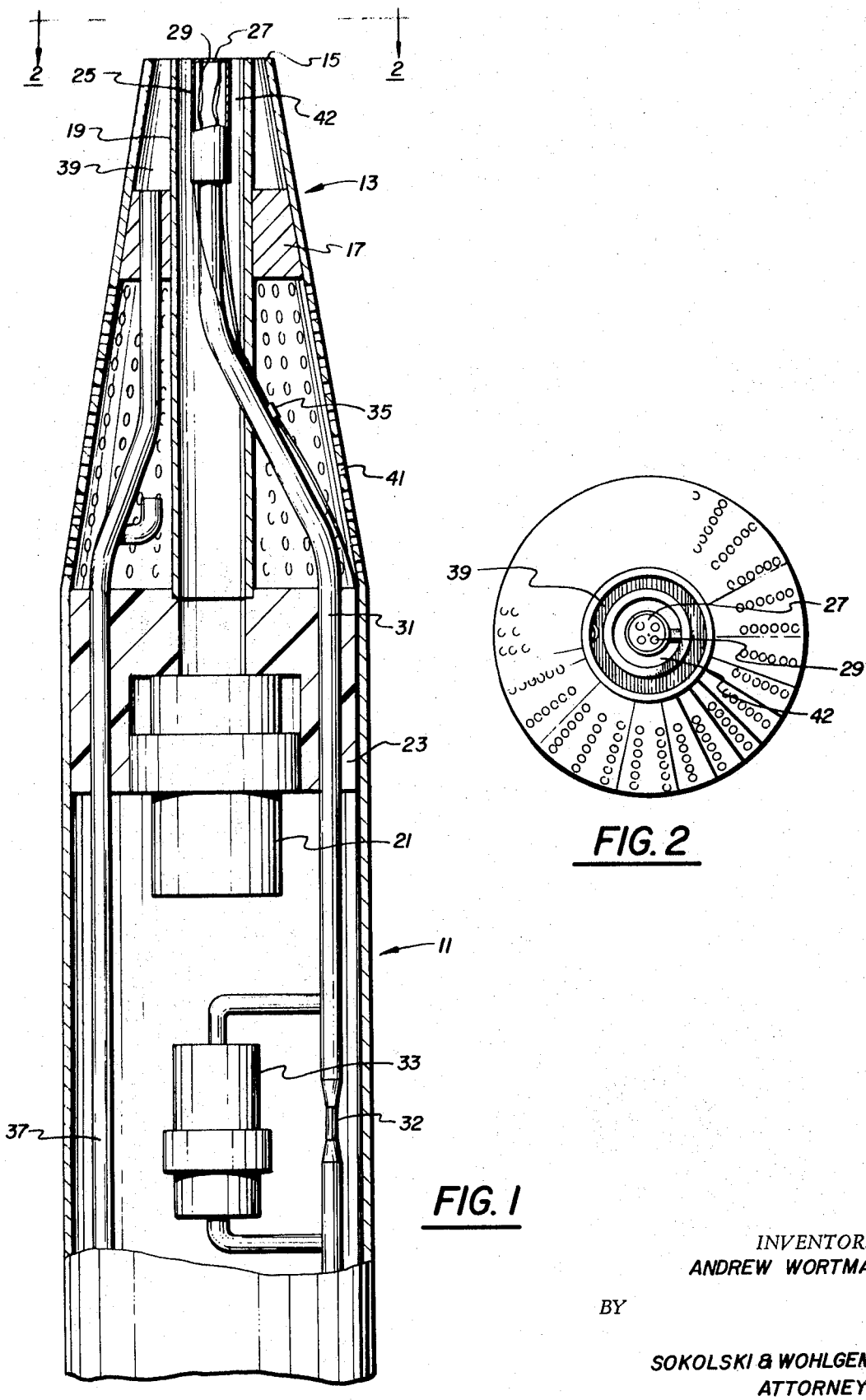
FIG. 1 is a partially sectioned schematic representation of a first embodiment of the device of this invention.
FIG. 2 is a view taken along lines 2—2 of FIG. 1.

The principles of operation of the device are based on the observation that if a surface at the stagnation point is kept at a certain temperature by transpiration cooling, then measurements of surface temperature, pressure and coolant flow rate yield enough information to obtain the total enthalpy of the flow. The basic heat transfer relation may be taken to be the relation $$\dot{q}_0 = \frac{\dfrac{0.76}{0.6}\left(\dfrac{\rho_w \mu_w}{\rho_s \mu_s}\right)^{0.1}}{\sqrt{\rho_s \mu_s \left(\dfrac{du_e}{dx}\right)_s}} \left[1 + (L_e^{0.52}-1)\frac{h_D}{H_T}\right](H_T - h_w) \quad (1)$$

The symbols in the above quotation are defined in the list of symbols.

Subscripts $w$ and $s$ indicate wall and stagnation conditions, respectively. The above relation for the heat transfer rate may be simplified considerably by means of real gas correlations and by expressing the velocity gradient in terms of stagnation pressure and density. In general, the heat transfer rate at the stagnation point may be expressed as $$\dot{q}_0 = \dot{q}_0(H_T, P_T, R_N, h_w) \quad (2)$$

Injection of fluid through the surface introduces rather complex phenomena which, in general, tend to decrease the rate of heat transfer to the surface. However, if an inert gas is injected, then no additional chemical reactions take place; and the net heat transfer rate to the wall is expressed in terms of the mass flow rate per unit area, injected gas properties, and the same quantities which determine the basic undisturbed heat transfer rate.

The relation for the heat transfer rate to a transpiration cooled surface may be written as $$\dot{q} = \dot{q}_0 \cdot \psi(H_T, P_T, R_N, h_w, m, f) \quad (3)$$

The function $\psi$ is the effectiveness of blowing in reducing the heat transfer to the surface. The function $f$ contains transport properties of the gases.

In general, the above relation can be established experimentally. The energy balance on an element of the surface is written as $$c \frac{\partial T_w}{\partial t} = \nu \epsilon T_W^4 + \lambda_i (T_w - T_c) = \dot{q}_0 \cdot \psi \quad (4)$$

In the device proposed here, the thermal capacity $c$ is minimized by using a thin skin to avoid the inherent errors in the differentiation of the thermocouple readings. Also, heat transfer to the interior is minimized to reduce the number of significant parameters.

Because of the low thermal capacity of the primary sensor element, the time-dependent term in Equation 4 disappears in most steady-state flow facility applications. Thus the heat balance on the sensor element is essentially a relation between the measured wall temperature and the net heat transfer to the surface. The basic quantities entering into the problem are $$\dot{q}_0, \psi, P_T, \dot{m}, R_N, h_w, f, H_T$$

where $\dot{q}_0$ and $\psi$ are known semi-empirical relations
$P_T$ and $\dot{m}$ are measured directly
$R_N$ is a constant of the instrument
$h_w$ and $f$ are known functions of the blowing rate, surface temperature, and physical properties of the gases.

Total enthalpy is derived from the above relations and Equation 4.

Actually, as was pointed out previously, the above relations contain within themselves the assumption of a fixed relation between stagnation pressure and and the velocity gradient which appears in Equation 1. Since it is well known that such an assumption is not true at lower Mach numbers the device of the invention has provisions to measure the stagnation point pressure gradient in situations where such measurement would be needed to enhance the accuracy of the instrument.

Turning now to the figures, there is seen in FIGS. 1 and 2 a first simplified embodiment of the device of this invention. The sensor is comprised of a main cylindrical body portion 11 having a tapered conical nose portion 13. The hollow body 11 can be formed of suitable material such as stainless steel or tungsten. Disposed within the body, adjacent the front or leading end 15, is a bulkhead 17 formed of a solid piece. The bulkhead serves as a stiffening element as well as a support. Passing through the center of the bulkhead 17 and disposed concentrically within the conical nose portion 13 is a pressure sensing tube 19 which leads to a pressure transducer 21 shown schematically mounted within an insulation support. 23. The insulation can, for example, be a block of Teflon or other similar material. Disposed concentrically within the pressure sensing tube 19 is a small tube 25 which has a very thin disc 27 affixed to the front end thereof. Disc 27 as seen in FIG. 2 has a plurality of holes 29 formed therein. This disc serves as a main sensing element for determining the temperature of the stream in front of the sensor. Connected to the back of disc 27 are at least four thermocouples 29, which serve to sense the temperature of the perforated plate 27. Supporting the tube 25 is a line 31 which further serves to conduct a coolant from a source not shown to and through the apertures 29 in the perforated plate 27. The coolant in line 31 is metered at a Venturi 32 by a pressure transducer 33. As seen, the leads from thermocouples 27 can, for example, traverse a portion of line 31, then be connected to a plug 35 in the wall of the tube 31, and directed along the inside of the body 11 of the device to a pickup source not shown.

The device of the invention is additionally provided with a line 37 for conducting coolant to an annulus 39 surrounding the pressure sensing tube 19 and the conical nose portion 13, which coolant is dumped out of the front end of the device. Further, a branch of the line 37 serves to dump coolant into the body of the sensor between the bulkhead 17 and the insulating block 23, such that the coolant can pour out of the body through a plurality of apertures 41 and transpirationally cool this portion of the probe.

Thus in the operation of the device, the primary sensor element or disc 27 located in the central portion of the nose 13 is maintained at its design temperature by the primary coolant flow from line 31. The coolant flow is metered by the orifice 32. The stagnation pressure measurements required are made in the annular port 42 surrounding tube 25 which contains the disc element 27. The primary coolant flow rate is then regulated by a valve (not shown) which is controlled by the temperature signal from the thermocouples 29 embedded in the sensor plate 27. The rate at which the secondary coolant is injected into the body is not critical and can be easily adjusted so that sufficiently large quantities are utilized to prevent deterioration of the sensor element body.

As pointed out in the aforegoing theoretical discussion forming the basis of this invention, the heat transferred to a surface is a function of the energy level of the external stream, pressure, and the geometry of the object. There is a unique relationship between the injection of a fluid at a surface and the heat transfer to that surface. This relationship involves a reduction of the heat transfer to the rate of blowing of the fluid over the surface. Thus, when one knows the heat transfer to a surface, which is obtained in the instant device from a surface temperature probe, and one measures the flow rate of coolant and pressure on the surface, the total energy or enthalpy of a system can then be obtained, in accord with Equation 4. In addition to utilizing the device of the invention to obtain the total energy or enthalpy determination in steady state and transient flow facilities, i.e., ground facilities that simulate actual flight conditions, it should be apparent that the device can be utilized in actual flight conditions. Utilizing the information obtained from the probe, and in combination with a small onboard computer system, one could determine the velocity of the vehicle to which the sensor is attached. From this, one could also calculate the density of the air through which the vehicle is travelling, which in turn will give an indication of the altitude of the vehicle.

Figure 4:
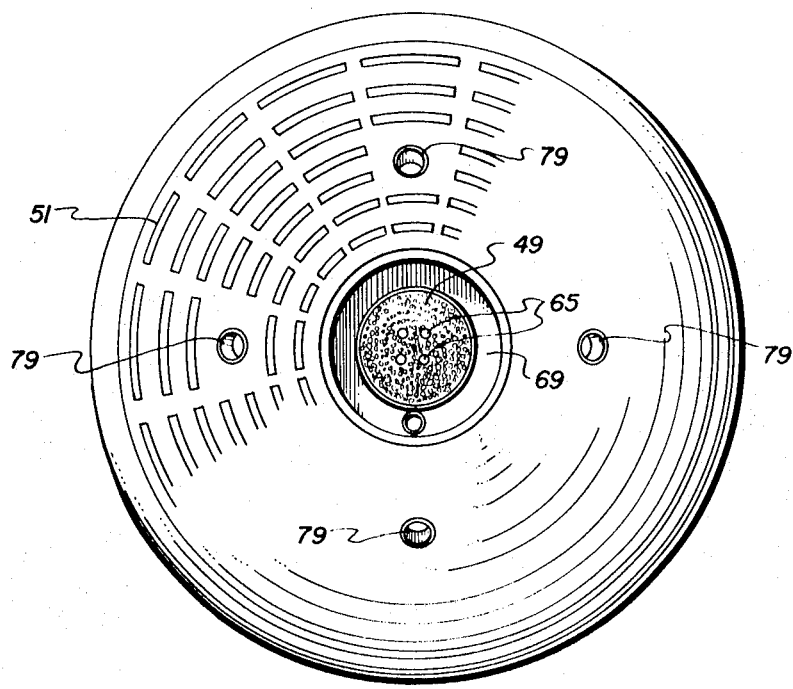
FIG. 4 is a front view taken along lines 4—4 of FIG. 3.
Figure 3:
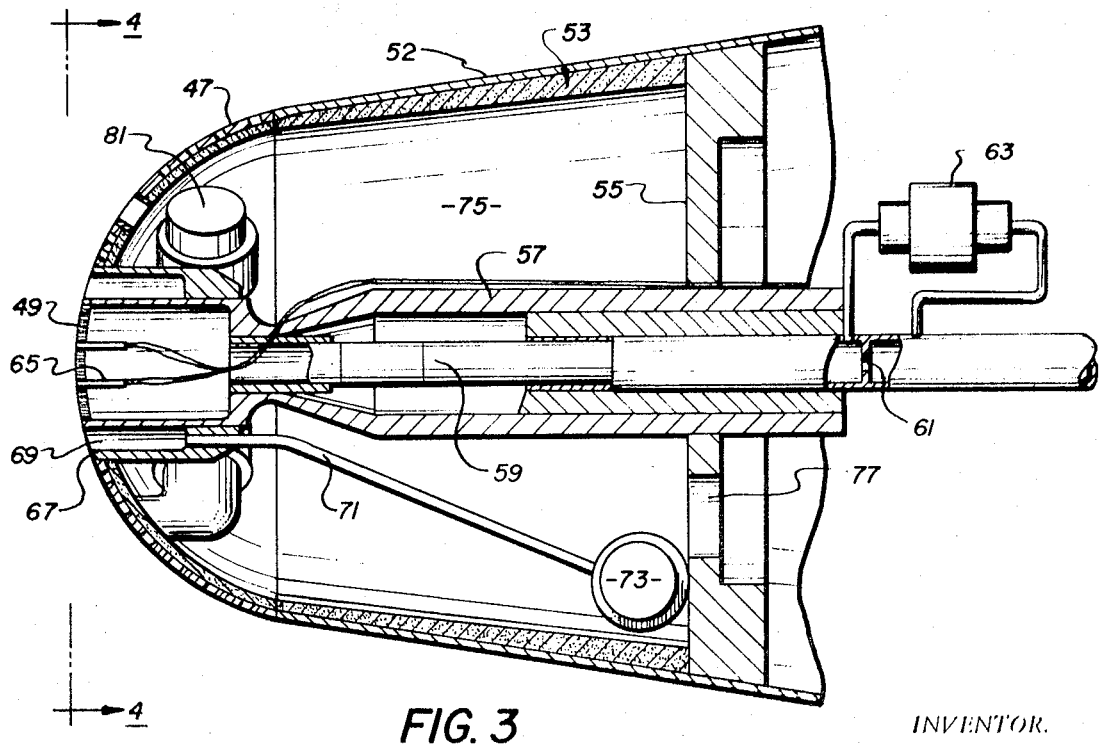
FIG. 3 is a partially sectioned pictorial representation of a second embodiment of the invention.

Turning now to FIGS. 3 and 4, there is seen a second embodiment of the invention which is quite similar in many respects to that shown in FIGS. 1 and 2. One of the most apparent differences between the two devices is that of the second embodiment as a hemispherical nose portion 47 with the thin sensing plate 49 forming the center portion thereof as particularly seen in FIG. 4. The nose portion 47 has a plurality of cooling slots 51 formed therein, surrounding the disc portion 49. Bonded to the inside of the shell 52 of the device is a layer 53 of a porous sintered material such as tungsten which serves to aid in distribution of the coolant to the outer shell.

Disposed concentrically within the body and held by support structure 55 is tubular body 57 which at its forward end supports the disc 49. Primary coolant line 59 is supported and runs through the center of the tubular body 57 and carries coolant from a source not shown to the perforated disc 49 in the same manner as disclosed in the previous embodiment. Once again, the primary coolant flow is measured through an orifice 61 by means of a pressure transducer 63. Four thermocouples 65 are embedded within the sensor disc 49, serving to give temperature indications thereof. A concentric body 67 surrounds the disc 49 and forms a concentric area 69 from which the stagnation pressure can be sensed through a line 71 leading to pressure transducer 73.

The entire volume 75 within the device is flooded with coolant entering through a port 77 in the support structure 55 from a source not shown. The secondary coolant then is emitted to transpirationally cool the surface of the probe through slots 51 as distributed by the porous sintered material 53. To this point, except for the use of the sintered metal and porous metal to meter the secondary coolant flow as well as providing a hemispherical nose portion, the instant device is essentially the same as that previously disclosed. One major difference is in the utilization of means to determine the pitch or yaw of the probe, or alternatively, the vehicle to which it is attached. This is accomplished by providing four equidistantly spaced holes 79 through the nose portion 47 of the device. Adjacent each hole 79 and mounted within the probe is a separate pressure transducer 81. The pressure differential over the four so spaced pressure transducers will indicate the pitch or yaw of the device.

It should be apparent that the embodiment of FIGS. 1 and 2 can have a hemispherical nose like the embodiment of FIGS. 3 and 4. Then the only essential difference between the two sensors would be in the presence of the four pressure transducers to sense the differential pressure about the disc.

Figure 5:
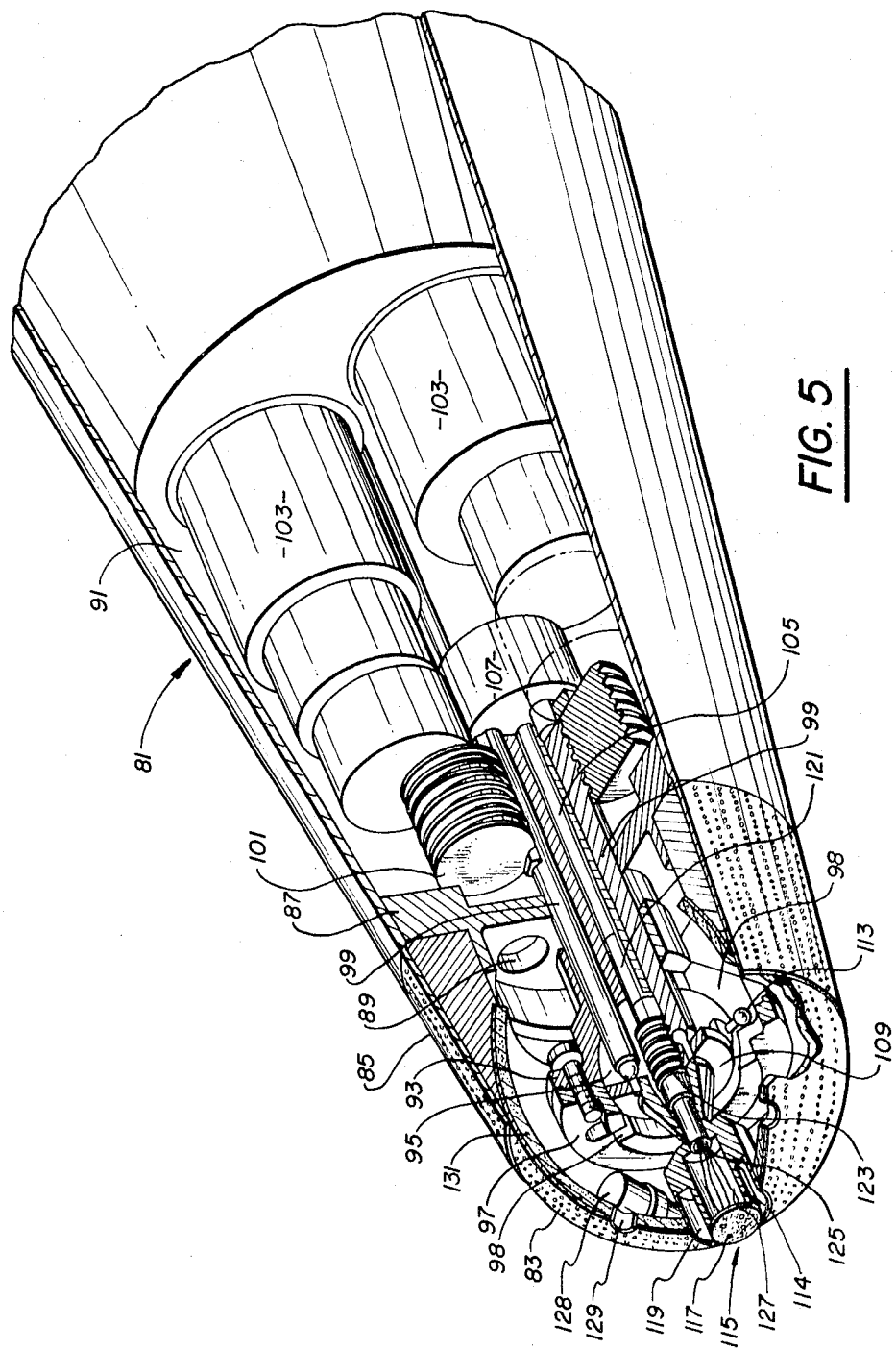
FIG. 5 is a partially sectioned pictorial view of a third embodiment of this invention.

Turning now to FIG. 5, there is seen a third embodiment of the herein invention which is essentially the same as that seen in FIG. 3 except that the nose portion of the device can be rotated. The device in this embodiment is comprised of a main conical housing 81, having a separate generally spherically shaped nose portion 83 seated therein. The spherical nose portion 83 together with the leading portion 85 of the housing 81 has a plurality of apertures therein to allow the coolant to dissipate to the atmosphere. A main support and mounting plate 87 is disposed within the housing 81. Plate 87 has apertures 89 therein to allow the secondary coolant which fills the main cavity 91 of the device to enter into the spherical nose portion 83 and dissipate therefrom. Extending forward from the support plate 89 toward the nose portion is a housing member 93 having a hemispherical cavity 95 formed therein. Attached to the front of the member 93 is a frame plate 97 additionally provided with a cavity portion corresponding to the hemispherical cavity 93 to further complete a portion of a spherical cavity. The frame and member 93 additionally cooperate in having four slots 98 therein whose function will be later described. Extending through the support plate to the rear of the housing are four push rods 99 whose rearward ends are connected to worm gears 101 driven by motors 103. Through the center of the support structure 87 there is provided a passageway 105 which passes through a center support block 107 and serves to carry the primary coolant from a source not shown to the nose of the device.

Within cavity 93 located in the spherical nose 83 of the device there is disposed an actuator plate 109. The actuator plate has four ball members 111 affixed thereto which seat in indentations formed in pushrods 99 yet are not connected or affixed to the pushrods. Further, the actuator plate has radially extending therefrom four alignment bells 113 which are seated within the slots 97. Extending forwardly toward the nose of the device from the plate 109 and affixed thereto is a housing 114 which is of the exact same configuration as seen in the embodiment of FIG. 3 and serves to both contain a perforated disc member 115 having thermocouples 117 imbedded therein as well as forming a concentric passage 119 through which the stagnation pressure can be sensed by a pressure transducer not seen in this figure.

Line 105 carrying the primary coolant to the sensing disc 115 has a fitting 121 seated within its forward end. Fitting 121 is integrally formed with a flexible bellows 123 which in turn has a tubular portion 125 leading into a cavity 127 behind the disc 115. The probe of this embodiment is again provided as was FIG. 3 with four pressure transducers 128 located to sense pressure through apertures 129 in the spherical nose portion. The information from the differential pressures received are fed to an onboard computer which in turn controls motors 103 and worm gears 101. These in turn actuate the pushrods 99 and cause movement of the plate 109. The movement of plate 109 is guided by the bell members 113 moving in the slots 97 and allow the entire generally spherical shaped nose portion 83 to rotate in accord with the action of the push rods on the plate in an 82° column of excursion. This thus provides an automatic alignment of the sensor disc axis with the free stream velocity and gives data on vehicle attitude with respect to the velocity. By this means the device can measure very large angles of attack since the sensing disc is perfectly aligned with the flow. The previously described embodiments can be used only at small angles of attack because the relations used to derive the enthalpy are applicable only near or at the stagnation point of the flow. Once again, in this embodiment a porous sintered layer 131 is provided behind the perforated wall portion of the sphere 83 and the leading portion 85 of the conical body portion 81, to distribute and control the flow of coolant.

LIST OF SYMBOLS $c$—Thermal capacity of the sensing element
$f$—Function defined in Equation 3
$h_D$—Dissociation energy of air, Equation 1
$h_w$—Enthalpy of the gas at wall conditions
$H_T$—Total enthalpy of the flow
$L_e$—Lewis-Semenov number
$\dot{m}$—Coolant flow rate per unit area
$P_T$—Stagnation pressure
$\dot{q}$—Local heat transfer rate
$\dot{q}_0$—Local heat transfer rate without coolant injection
$R_N$—Stagnation point radius of curvature
$t$—Time
$T_c$—Coolant temperature
$T_w$—Model surface temperature
$u_e$—Edge of boundary layer velocity
$x$—Coordinate along the surface
$\epsilon$—Emissivity of the surface
$\lambda_i$—Heat transfer coefficient to the interior of the model
$\mu_s$—Viscosity of gas at stagnation conditions
$\mu_w$—Viscosity of gas at wall conditions
$\nu$—Stefan-Boltzmann constant
$\psi$—Function defined in Equation 3
$\rho_s$—Density of gas at stagnation condition
$\rho_w$—Density of gas at wall condition
$\sigma$—Prandtl number

I claim:

1. An enthalpy and pressure sensor comprising:
    a housing having a forward nose end,
    a perforated disc disposed in said nose, said disc being exposed to the environment,
    means in said housing for injecting a primary coolant through the perforation in said disc means for sensing the primary coolant flow rate,
    means in said housing for sensing the temperature of said disc,
    and means in said housing for sensing the stagnation pressure about said disc.

2. The sensor of claim 1 wherein said housing has a plurality of apertures therein,
    and means in said housing for injecting a secondary coolant through said apertures.

3. The device of claim 1 further including:
    a tubular line for conducting said primary coolant,
    said disc being mounted on the end of said line.

4. The device of claim 3 further comprising:
    a concentric tube surrounding said coolant line at the forward nose portion about said disc,
    said pressure sensing means connected to said concentric tube to sense the pressure surrounding said disc.

5. The device of claim 1 wherein:
    said housing has a generally hemispherical nose portion with said disc disposed in the center thereof.

6. The device of claim 5 further comprising:
    four equidistantly placed openings in said nose portion about said disc,
    and a separate pressure sensing means disposed in said housing adjacent each of said openings to sense the differential pressure about said disc.

7. The device of claim 1 wherein said nose end is a separate generally spherically-shaped body with said disc forming part of the surface thereof, and further comprising:
   means for sensing the differential pressure about said nose portion,
   and means responsive to said pressure sensing means for rotating said nose.

8. A method of sensing enthalpy and pressure in high energy flow streams comprising:
   disposing a perforated disc in said stream,
   transpirationally cooling said disc,
   measuring the temperature of said disc,
   measuring the flow rate of the coolant for transpirationally cooling said disc,
   and measuring the stagnation pressure immediately surrounding said disc.

9. The method of claim 8 further comprising:
   measuring differential pressure about said disc to determine the attitude of said disc in said stream.

10. The method of claim 9 further comprising:
    moving said disc in said stream in response to the differential pressure measurements obtained.

References Cited

UNITED STATES PATENTS 3,204,447   9/1965   Krause et al.
3,138,025   6/1964   Fengerson.

JAMES J. GILL, Primary Examiner

H. GOLDSTEIN, Assistant Examiner

UNITED STATES PATENT OFFICE
CERTIFICATE OF CORRECTION

Patent No. 3625056                           Dated December 7, 1971

Inventor(s)  Andrew Wortman

It is certified that error appears in the above-identified patent and that said Letters Patent are hereby corrected as shown below:

In column 2, lines 68/69, equation 3 should read as follows:

$$\dot{q} = \dot{q}_o \cdot \psi(H_T, P_T, R_N, h_w, \dot{m}, f) \qquad (3)$$

Signed and sealed this 25th day of April 1972.

(SEAL)
Attest:

EDWARD M. FLETCHER, JR.            ROBERT GOTTSCHALK
Attesting Officer                  Commissioner of Patents